Aug. 2, 1966  B. L. SIEGAL ETAL  3,263,369
AWNING STRUCTURE
Filed April 22, 1964  3 Sheets-Sheet 1

INVENTORS
Burton L. Siegal
Nicholas S. Kategianis
by Hill, Sherman, Meroni, Gross & Simpson
ATTORNEYS Aug. 2, 1966     B. L. SIEGAL ETAL     3,263,369
AWNING STRUCTURE
Filed April 22, 1964     3 Sheets-Sheet 2
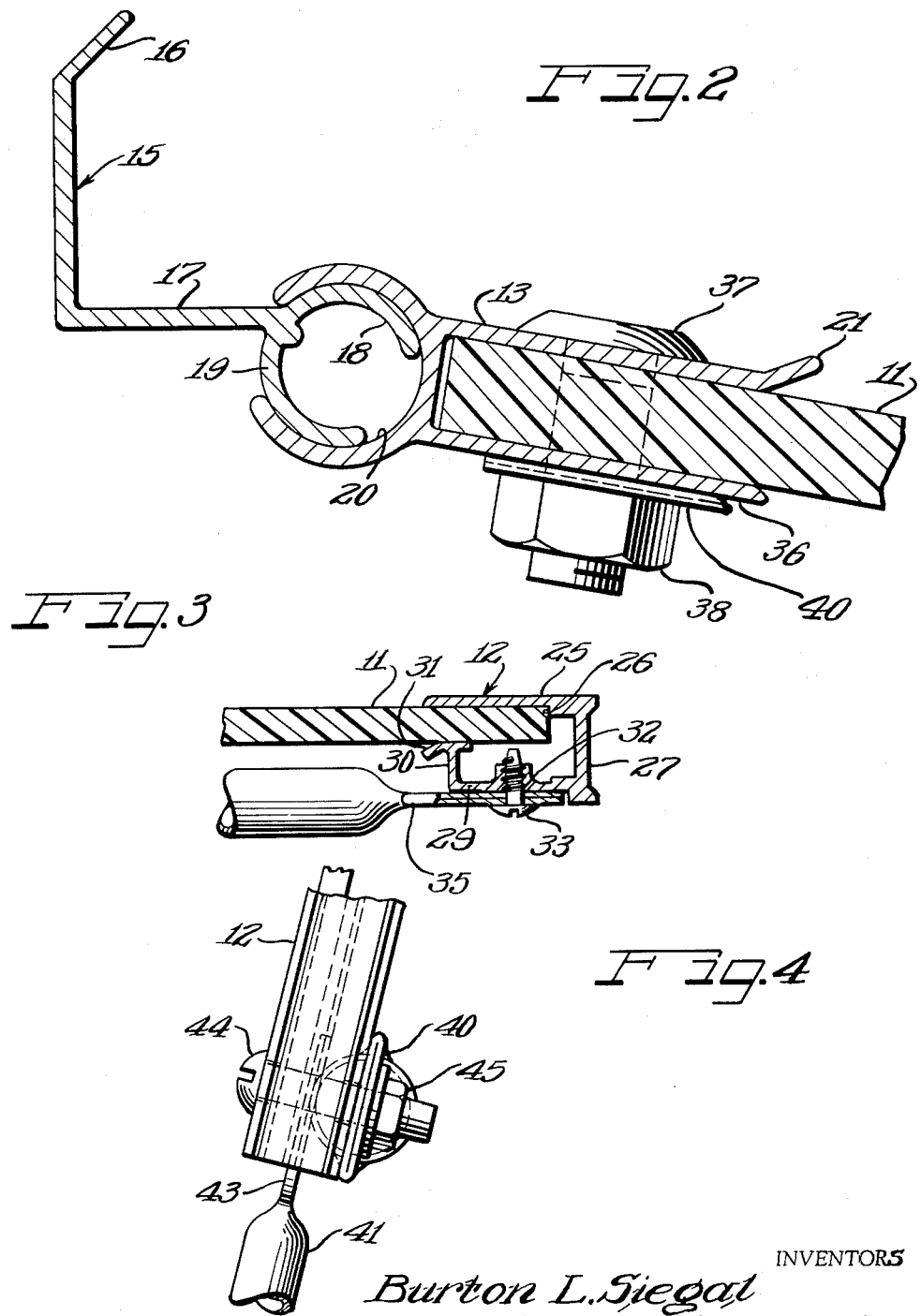
INVENTORS
ATTORNEYS Aug. 2, 1966   B. L. SIEGAL ETAL   3,263,369
AWNING STRUCTURE Filed April 22, 1964   3 Sheets-Sheet 3

INVENTORS
Burton L. Siegal
Nicholas S. Kategianis
by
ATTORNEYS

United States Patent Office 3,263,369  
Patented August 2, 1966

3,263,369  
AWNING STRUCTURE  
Burton L. Siegal and Nicholas S. Kategianis, Chicago, Ill., assignors to Kenron Awning & Window Corporation, Chicago, Ill., a corporation of Illinois  
Filed Apr. 22, 1964, Ser. No. 361,787  
6 Claims. (Cl. 49—397)

A principal object of the present invention is to provide a new and improved form of awning structure arranged with a view toward utmost simplicity in construction and assembly to the wall of a building.

Another and important object of the invention is to provide a new form of awning in which a fiberglass awning panel forms the skin of the structure and is stressed to form a rigid structural member.

Another object of the invention is to improve upon the prior rigid awning structures having a flexible awning panel, by so constructing the support for the panel as to avoid the collection of water along the support members therefor, and by bowing the panel to a selected shape by the use of tension members connecting front and rear supports for the panel, together.

A further object of the invention is to simplfy the rigid awning structures heretofore in use by placing the frame structures for the awning panel under tension, and bowing the awning panel to take the heavy loads of snow and the like, by tension of the frame members.

A further object of the invention is to simplify the present rigid awning structures having metal frames and fiberglass panels and prevent rattling of the panel and leakage of water between the panel and framework, by mounting the panel in channels at its front and rear ends and by stressing the panel by tension members connected between the channels.

Still another object of the invention is to provide a novel and improved form of awning structure having at least one fiberglass panel and front and rear support channels therefore into which the panel is mounted, and by providing generally A-frame support and tensioning structures for the panel stressing the panel to form a structural part of the framework.

Yet another and important object of the invention is to provide an improved form of detachable connector for connecting an awning structure to the frame for a door or window, or to the wall of a building.

These and other objects of the invention will appear from time to time as the following specification proceeds and with reference to the accompanying drawings wherein:

FIGURE 2 is a fragmentary sectional view taken substantially along line II—II of FIGURE 1;

FIGURE 3 is a fragmentary transverse sectional view taken substantially along line III—III of FIGURE 1;

FIGURE 4 is a fragmentary side view of a portion of the front arched channel for the awning panel, showing certain details of the A-frame connection to the channel;

Figure 1:
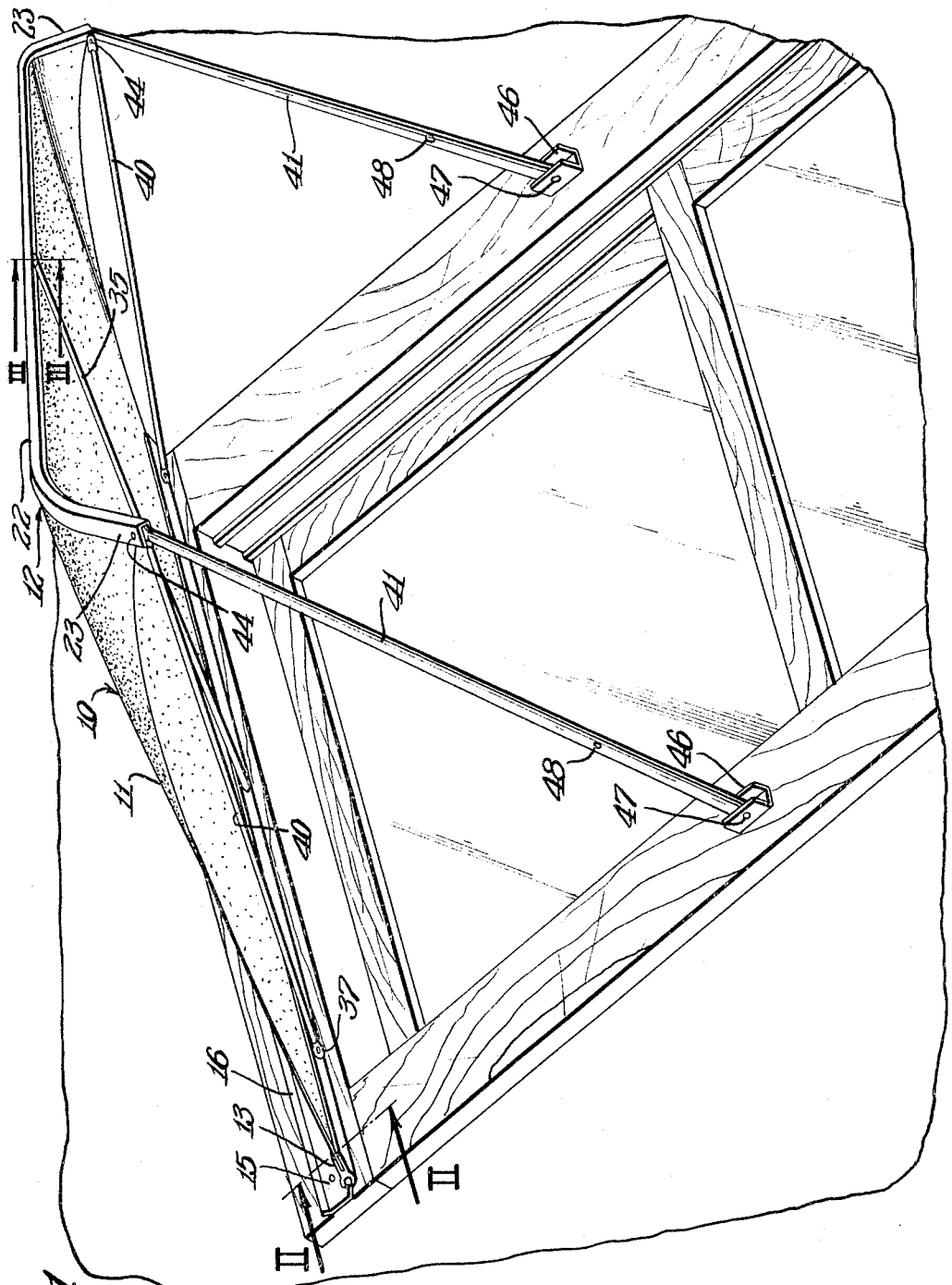
FIGURE 1 is a perspective view of a rigid awning constructed in accordance with the principles of the present invention, looking at the awning from one side and the bottom thereof, in order to more clearly illustrate the invention.
Figure 5:
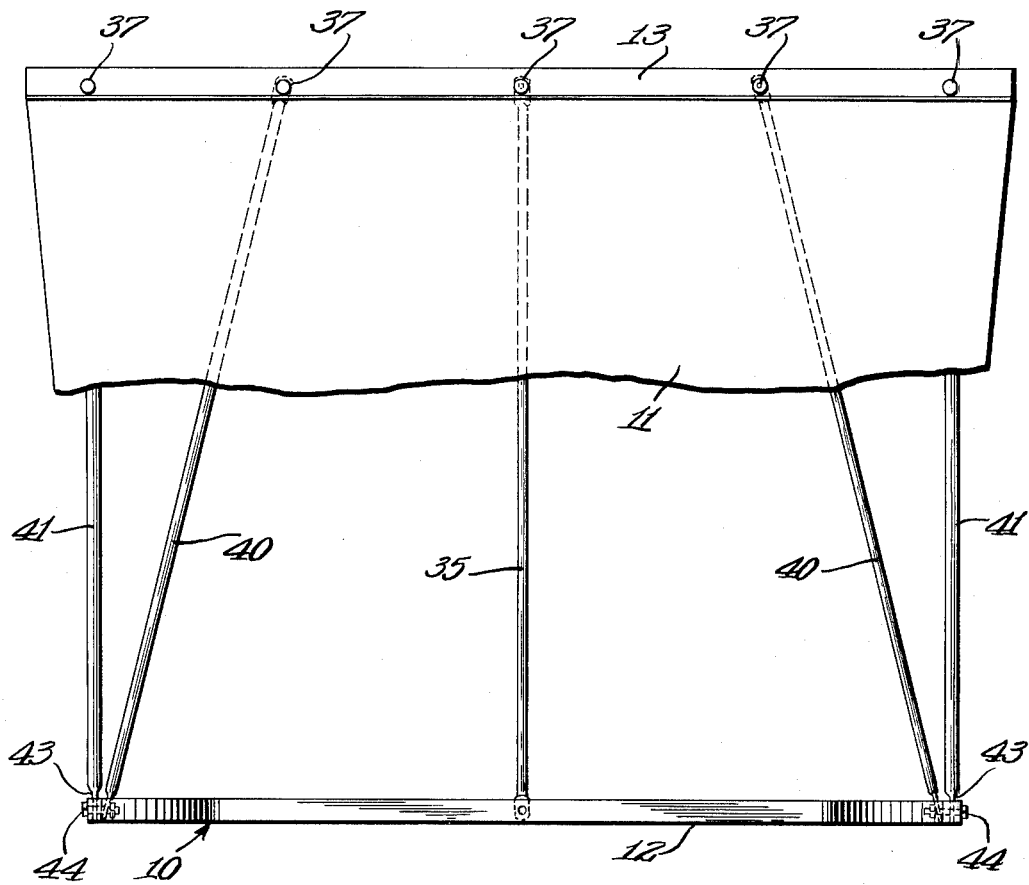
FIGURE 5 is a fragmentary plan view of the awning structure shown in FIGURE 1, with the awning panel broken away.

In the embodiment of the invention illustrated in the drawings, I have shown in FIGURE 1 a rigid awning structure 10 mounted on the frame of a window to extend over a window opening, and shown as looking at the window opening and awning structure from the bottom and one side thereof in order to more clearly illustrate certain features of the present invention.

The awning structure 10 includes a panel 11 which may be made from fiberglass or a like material. The panel 11 is herein shown as being made from a plain sheet of fiberglass material, but may be made from a corrugated sheet of fiberglass material, with the corrugations preferably extending longitudinally of the awning panel. The awning panel 11 is supported at its front end in an arched channel 12 and at its rear end in a facing rectilinear channel 13. The rear channel 13 is shown as being mounted on a bracket 15 by slidable movement along said bracket from one end thereof.

The bracket 15 is shown as extending across the top of a window frame and is suitably secured thereto. The bracket 15 has an outwardly inclined upper lip 16, forming a recess for caulking compounding (not shown), between the window frame and the inside of said lip to prevent the seepage of water along the back of the bracket. The bracket 15 also has a support leg 17 extending outwardly therefrom for the length thereof. The leg 17 has a bifurcated end portion forming a generally semi-cylindrical knuckle joint for the channel 13, one furcation 18 of which extends upwardly of said leg and then downwardly in an arcuate path and the other furcation 19 of which extends downwardly and forwardly therefrom in an arcuate path. The outer surfaces of the furcations 18 and 19 form a generally semi-cylindrical support for a semi-cylindrical socket 20, extending rearwardly of the rear channel 13. The socket 20 and rear channel 13 are slid onto the cylindrical support formed by the arcuate furcations 18 and 19 from an end thereof, and may be mounted thereon after the awning panel is assembled onto the rear channel 13 and the front arched channel 12. The upper leg of the rear channel 13 has an upwardly extending lip inclined upwardly from the forward end portion thereof to facilitate the assembly of the panel 11 in the channel 13.

The front channel 12 is of a generally arch-like form having a relatively flat intermediate portion 22 terminating into outwardly inclined opposite end portions 23, uniformly curving downwardly and outwardly from the flat portion 22 to the selected angles of the end portions 23.

As shown in FIGURE 3, the channel 12 has a top leg 25 the undersurface of which is adapted to be abutted by the top surface of the panel 11 and has a shoulder 26 extending therealong limiting inward movement of the panel with respect to said channel. The channel also has a front web 27 and a bottom leg 29, shown in FIGURE 3 as being spaced from the bottom of the panel 11 and as having an upwardly extending inner end wall 30, having a foot 31 on the upper end thereof, engaging the bottom surface of the panel 11 and forming a support therefor. The bottom leg 29 also has a plurality of spaced bosses 32 extending upwardly therefrom forming mountings for screws 33, which may be self-tapping screws. In FIGURE 3, a screw 33 is threaded in the boss 32 and retains a central tensioning member 35 thereto. The central tensioning member 35 may be a tube or strap and extends beneath the awning panel 11 to the rear channel 13 beneath a lower flange 36 of said channel and is secured at its rear end to said channel as by a bolt 37 having a nut 38 threaded thereon. The bolt 37 also extends through the panel 11 and serves to retain the awning panel 11 to the rear channel 13. The central tensioning member 35 is shorter than the distance between its points of connection to the channels 12 and 13 when the panel 11 is unstressed. A plurality of bolts 37 may be spaced along the rear channel 13 to retain the awning panel thereto and to retain tension members 40 to said rear channel.

The panel 11 is stressed or bowed upwardly to conform the panel generally to the form shown in FIGURE 1 and enable the panel to take heavy snow loads, by the central tensioning member 35 and the outer tension members 40, connected to the undersides of the channel 13 inwardly of the outer ends thereof, as by the nuts and bolts 37 and 38, and connected at their outer ends to the bolts 44 on the insides of the arched channels 12. The tension members 40 are shorter than the distance between the points of connection of said tension members to the channels 12 and 13. The panel 11 must then be compressed or flexed when connecting the tension members to said channels and the stored up energy of awning panel maintains the tension members under tension and rigidifies the panel and awning structure.

A separate support tube 41 is provided for each end of the awning structure 10. Each support tube has a flattened end portion 43 extending within the open portion of the channel 12 at the end thereof, and is pivotally connected thereto as by a bolt 44 having a nut 45 threaded on the inner end thereof. The support tubes 41 have bracket members 46 transversely pivoted to the inner ends thereof, as by pins 47, and screwed or otherwise secured to the frame of a window or door, or wall of a building. Each tube 41 is provided with a plurality of holes 48 therein. In assembling the awning structure to a door or window of a building, the tubes may be cut off in outwardly spaced relation with respect to a selected hole 48, to pitch the awning at a selected pitch. The tensioning members and support tubes 41 thus form substantially A-frame structures at opposite sides of the awning, thus supporting the awning panel in the desired position and providing a relatively rigid awning structure, which will not rattle in wind and the like, the tensioning members 40, 40 and 35, being under tension and the support tubes being under compression except in wind in which case the support tubes are under tension.

In assembling the awning, the bracket 15 is first screwed or otherwise secured to a window, door frame, or wall of a building. The awning panel being assembled to the front and rear channels 12 and 13, respectively, by sliding thereinto from the ends thereof, may then be held in position to the rear channel 13 by the nuts and bolts 37 and 38, and may be held in position in the arched channel 12 by the bolts 44 extending transversely through the opposite ends of said channel and connecting the supports 41 and tension bars 40 thereto. The awning panel may then be bowed upwardly by the central tensioning member 35 and may then be bolted in place. The tensioning members 40, 40 may also be connected to the underside of the rear channel 13 inwardly of the ends thereof as by the nuts and bolts 37 and further bow the panel to the desired form. The semi-cylindrical socket 20 may then be slid onto the cylindrical support formed by the furcations 18 and 19 from one end thereof. The connector brackets 46 may then be screwed or otherwise secured to the window frame, door frame or wall of the building, in the proper position to maintain the panel 11 at the desired pitch.

It may here be seen that the tension members 40 connected to the rear channel 13 inwardly of the ends thereof and connected to the front arched channel 12 at the ends thereof with the supports 41, form substantially A-frames at each side of the awning, and that the tensioning members and central tensioning member 35, bow the awning panel upwardly, and form the panel into a load bearing member of the structure, and increase the capacity of the structure to take heavy snow loads, besides maintaining the rigidity of the structure.

Figure 6:
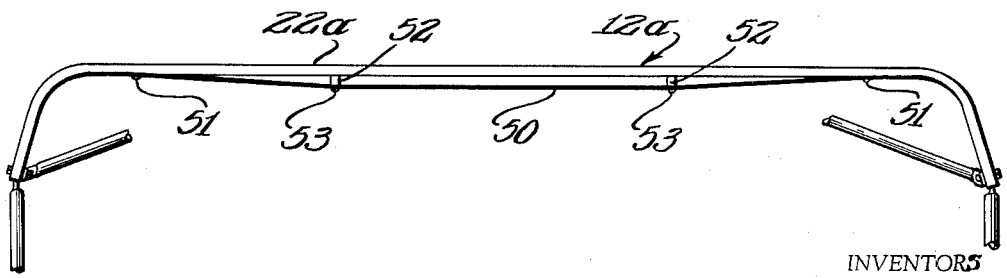
FIGURE 6 is a front end view of a modified form of awning structure embodying the invention.

In the form of the invention, illustrated in FIGURE 6, we show an awning structure particularly adapted for large spans, as for example, spans of eight feet and over. The frame structure is generally the same as in the form of the invention illustrated in FIGURES 1 through 5 except a channel member 12a of the awning structure is slightly bowed upwardly by a tension strip 50, which may be made from strip steel or aluminum. The strip 50 is secured at its ends to the underside of the channel 12a, adjacent opposite ends of the flat portion 22a thereof, as by machine screws 51, 51 and is spaced from the underside of the flat portion 22a intermediate the ends by spacer blocks 52, 52.

In assembling the strip 50 to the front channel 12a, the channel 12a may be slightly bowed upwardly and the strip 50 may then be connected thereto. The spacer blocks 52, 52 may then be placed between the strip 50 and the bottom of the flat portion 22a of the channel 12a, to increase the tension of the strip 50. Said spacer blocks may be secured to the underside of the channel by screws 53, which may be self-tapping screws and also extend through the strip 50 and secure said strip to said spacer blocks and channel.

While we have herein shown and described one form in which our invention may be embodied, it may readily be understood that various variations and modifications in the invention may be attained without departing from the spirit and scope of the novel concepts thereof.

We claim as our invention:

1. In an awning structure, a rear rectilinear channel member adapted to be secured to the wall of a building, a front channel member arched at its opposite ends, said channel members having facing channels opening to opposite ends thereof, a flexible awning panel slidably mounted in said channel members, supports for said awning panel connected between opposite ends of said arched channel and a wall of a building, end tensioning members connected between said arched channel at the points of connection of said connectors thereto and connected to said rear channel inwardly of the ends thereof and stressing said awning panel upwardly and maintained under tension by the stored up energy of said awning panel, and a tensioning strut extending beneath and connected to opposite end portions of said front channel and bowing said front channel upwardly.

2. An awning structure in accordance with claim 1 wherein spacer blocks are provided between the underside of said tensioning strut and said front channel.

3. An awning structure in accordance with claim 1 wherein a central tensioning member extends between said end tensioning member wherein spacer blocks are provided between the underside of said tensioning strut and said front channel and wherein securing means extend through said strip and spacer blocks and secure said spacer blocks to the underside of said front channel.

4. In an awning structure, a support bracket adapted to be secured to the wall of a building and to extend over an opening in the wall of a building, said support having a generally circular support structure and extending in advance thereof, a rear channel having a semi-cyclindrical socket mounted on said circular support structure by slidable movement therealong from an end thereof, said channel having an outwardly opening channel therein, a fiberglass awning panel mounted in said channel and extending in advance thereof, means retaining said awning panel to said channel, a front arched channel facing said rear channel and receiving said awning panel and forming said awning panel into a generally arched form at its forward end, a central spacer connecting said channels together, supports pivoted to opposite ends of said arched channel and extending angularly downwardly and inwardly therefrom for connection with the wall of a building, and tensioning members connected between opposite ends of said arched channel at the points of connection of said supports thereto and connected to said rear channel intermediate the ends thereof, said tensioning members being shorter than the distance from their points of connection with said arched channel to said rear channel when said panel is inserted in said channels in an unstressed condition and means connecting said tensioning members to said rear channel inwardly of the ends of the rear channel, at a spaced apart spacing less than the spacing between said tensioning members at their points of connection to said arched channel and bowing said awning panel upwardly and maintained under tension by the stored up energy of said awning panel.

5. In an awning structure,
a rear rectilinear channel member adapted to be secured to the wall of a building,
a forwardly spaced front arched channel member,
said channel members having facing channels opening to each other,
a rectangular flexible awning panel slidably mounted along its front and rear edges in said channels,
and two laterally spaced tensioning members connected between the opposite ends of said front arched channel and intermediate the ends of said rear channel,
said tensioning members being shorter than the distances between their points of connection with said arched channel and said rear channel when the awning panel is in its unstressed condition, and being spaced farther apart along said channels at their front ends than their rear ends,
and flexing said awning panel to a predetermined shape and maintained under tension by the stored up energy of said awning panel.

6. The structure of claim 5 wherein a central spacer connects said channels together intermediate the ends thereof and is shorter in length than the length of said awning panel when in an unstressed condition, and wherein supports are pivoted to opposite ends of said arched channel and extend angularly downwardly and inwardly therefrom for connection with the wall of a building.

References Cited by the Examiner
UNITED STATES PATENTS

| | | | |
|---|---|---|---|
| 1,309,352 | 7/1919 | Christopher | 160—352 X |
| 2,427,021 | 9/1947 | Rapp. | |
| 2,778,071 | 1/1957 | Anderson | 20—57.5 |
| 2,822,586 | 2/1958 | McNeil | 20—57.5 |
| 2,834,072 | 5/1958 | Miller | 20—57.5 |
| 2,867,273 | 1/1959 | Brennen et al. | 20—57.5 X |
| 3,107,401 | 10/1963 | Heirich | 20—57.5 |
| 3,122,394 | 2/1964 | Brydon | 135—6 X |

REINALDO P. MACHADO, *Primary Examiner.*

HARRISON R. MOSELEY, *Examiner.*

J. K. BELL, *Assistant Examiner.*